(12) United States Patent
Jang

(10) Patent No.: US 8,830,301 B2
(45) Date of Patent: Sep. 9, 2014

(54) STEREOSCOPIC IMAGE REPRODUCTION METHOD IN CASE OF PAUSE MODE AND STEREOSCOPIC IMAGE REPRODUCTION APPARATUS USING SAME

(75) Inventor: Jun-Yeoung Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 675 days.

(21) Appl. No.: 13/060,999

(22) PCT Filed: Jun. 10, 2009

(86) PCT No.: PCT/KR2009/003110

§ 371 (c)(1),
(2), (4) Date: Feb. 25, 2011

(87) PCT Pub. No.: WO2010/143759

PCT Pub. Date: Dec. 16, 2010

(65) Prior Publication Data

US 2011/0157331 A1    Jun. 30, 2011

(51) Int. Cl.
*G06T 15/00* (2011.01)
*H04N 13/04* (2006.01)
*H04N 13/00* (2006.01)

(52) U.S. Cl.
CPC ....... *H04N 13/0029* (2013.01); *H04N 13/0438* (2013.01); *H04N 13/0497* (2013.01)
USPC ............................. 348/43; 348/54; 345/427

(58) Field of Classification Search
USPC ...................................... 348/43, 54; 345/427
See application file for complete search history.

(56) References Cited

U.S. PATENT DOCUMENTS

| 2004/0160512 | A1 | 8/2004 | Lee | |
| 2010/0150523 | A1* | 6/2010 | Okubo et al. | 386/68 |

FOREIGN PATENT DOCUMENTS

| CN | 1938727 A | 3/2007 |
| EP | 1 727 090 A1 | 11/2006 |
| JP | 05-314243 | 11/1993 |
| JP | 2002-209233 A | 7/2002 |
| JP | 2006-191357 A | 7/2006 |
| KR | 10-2008-0071400 | 8/2008 |

OTHER PUBLICATIONS

Chinese Office Action dated Mar. 5, 2013 issued in Application No. 200980142260.X (with English translation).
International Search Report issued in PCT/KR2009/003110 dated Mar. 11, 2010.

* cited by examiner

*Primary Examiner* — Sath V Perungavoor
*Assistant Examiner* — Jeffery Williams
(74) *Attorney, Agent, or Firm* — KED & Associates LLP

(57) ABSTRACT

An apparatus, which forms a stereoscopic image by alternately displaying a left image and a right image, for reproducing a stereoscopic image in a pause mode, includes: a decoder unit configured to perform decoding on received image information; a 3D format generation unit configured to pair left and right images which are temporally consistent to generate stereoscopic image data; and a user input processing unit configured to receive a user selection with respect to image reproduction and delivering a corresponding signal to the decoder unit and the 3D format generation unit, wherein when the user input processing receives a to selection of a pause mode from the user, the decoder unit stops the decoding operation on the basis of the signal from the user input processing unit and the 3D format generation unit generates the stereoscopic image data by using the same left and right video frames. Even when a pause mode is selected while a stereoscopic image is being reproduced, the stereoscopic image can be outputted, and in this case, the stereoscopic image can be outputted in the pause mode without using any additional configuration.

11 Claims, 7 Drawing Sheets

STEREOSCOPIC IMAGE REPRODUCTION METHOD IN CASE OF PAUSE MODE AND STEREOSCOPIC IMAGE REPRODUCTION APPARATUS USING SAME

BACKGROUND OF THE INVENTION

1. Field of the Invention

The present invention relates to a method and apparatus for reproducing a stereoscopic image and, more particularly, to an apparatus and method for processing a stereoscopic image in a pause mode.

2. Description of the Related Art

Recently, as the interest in a stereoscopic image service is increasing, devices for providing a stereoscopic image have been continued to be developed. One of the schemes of implementing a stereoscopic image is a stereoscopic scheme.

A basic principle of the stereoscopic scheme is that images arranged to be perpendicular to a person's left and right eyes are separately inputted, and the images respectively inputted to the left and right eyes are coupled to generate a stereoscopic image in the person's brain. In this case, the arrangement of the images to be perpendicular to each other refers to a state in which the respective images do not interfere with each other.

Detailed methods for excluding interference include a polarization scheme, a time-sequential scheme, and a spectral scheme.

First, the polarization scheme is separating the respective images by using the polarization filter. Namely, the polarization filters perpendicular to the image for the left eye and the image for the right eye are applied, different images filtered by the polarization filters are inputted to the left and right visual fields. The time-sequential scheme is a method in which left and right images are alternately displayed and active glasses worn by the user are synchronized with the alternately displayed images to thus separate the respective images. Namely, when the images are alternately displayed, the shutter of the active glasses synchronized with the alternately displayed image opens only the visual field to which the corresponding image needs to be inputted and shuts the other visual field, thus separately inputting the left and right images.

Meanwhile, the spectral scheme is a method of projecting left and right images through a spectrum filter having a spectrum band in which RGB spectrums do not overlap. With respect to the thusly projected left and right images, the user wears passive glasses having the spectrum filter allowing only a spectrum area set for the left and right images, thus separately receiving left and right images.

However, as described above, the stereoscopic image is implemented by using two two-dimensional images, a phenomenon in which an image is unnatural or distorted may occur. In particular, if the stereoscopic image is paused while being reproduced, the related art stereoscopic image reproducing apparatus stops transmission of the left and right images, and only one of the left and right images currently being produced. Thus, when the 3D stereoscopic image being reproduced is changed to the 2D image, the original image slides to the left or right on the screen.

SUMMARY OF THE INVENTION

Therefore, in order to address the above matters, the various features described herein have been conceived.

An aspect of the present invention provides an apparatus and method for outputting a stereoscopic image even when the stereoscopic image is paused while being reproduced.

Another aspect of the present invention provides an apparatus and method for providing a stereoscopic image when the stereoscopic image is paused while being reproduced, without employing any other constitution.

Another aspect of the present invention provides an apparatus and method capable of improving users' viewing satisfaction by preventing the occurrence of a phenomenon in which a screen image is unnatural or a distortion phenomenon even when a stereoscopic image is paused while being reproduced.

According to an aspect of the present invention, there is provided an apparatus, which forms a stereoscopic image by alternately displaying a left image and a right image, for reproducing a stereoscopic image in a pause mode, including: a decoder unit configured to perform decoding on received image information; a 3D format generation unit configured to pair left and right images which are temporally consistent to generate stereoscopic image data; and a user input processing unit configured to receive a user selection with respect to image reproduction and delivering a corresponding signal to the decoder unit and the 3D format generation unit, wherein when the user input processing receives a selection of a pause mode from the user, the decoder unit stops the decoding operation on the basis of the signal from the user input processing unit and the 3D format generation unit generates the stereoscopic image data by using the same left and right video frames.

The 3D format generation unit may include: a frame time comparing unit configured to receive the left and right video frame streams and comparatively analyze the time relationship between the frames; a frame correction unit configured to output a pair of the left and right video frames which are temporally consistent on the basis of the analysis result from the frame time comparing unit; and a 3D format synthesizing unit configured to integrate the left and right video frames output from the frame correction unit to generate 3D format image data, wherein when the user input processing unit receives a selection of the pause mode from the user, the frame correction unit alternately repeatedly outputs the same left and right video frames to the 3D format synthesizing unit on the basis of the signal from the user input processing unit.

The 3D format generation unit may include: a frame time comparing unit configured to receive the left and right video frame streams and comparatively analyze the time relationship between the frames; a frame correction unit configured to output a pair of the left and right video frames which are temporally consistent on the basis of the analysis result from the frame time comparing unit; and a 3D format synthesizing unit configured to integrate the left and right video frames output from the frame correction unit to generate 3D format image data, wherein when the user input processing unit receives a selection of the pause mode from the user, the 3D format synthesizing unit repeatedly outputs the same 3D format image data on the basis of the signal from the user input processing unit.

According to another aspect of the present invention, there is provided a method, which forms a stereoscopic image by alternately displaying a left image and a right image, for reproducing a stereoscopic image in a pause mode, including: reproducing a stereoscopic image; while the stereoscopic image is being reproduced, receiving a selection of a pause mode from a user; and when the pause mode is entered, generating the stereoscopic image by using the same left and right images, to thus form the stereoscopic image even in the pause mode.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
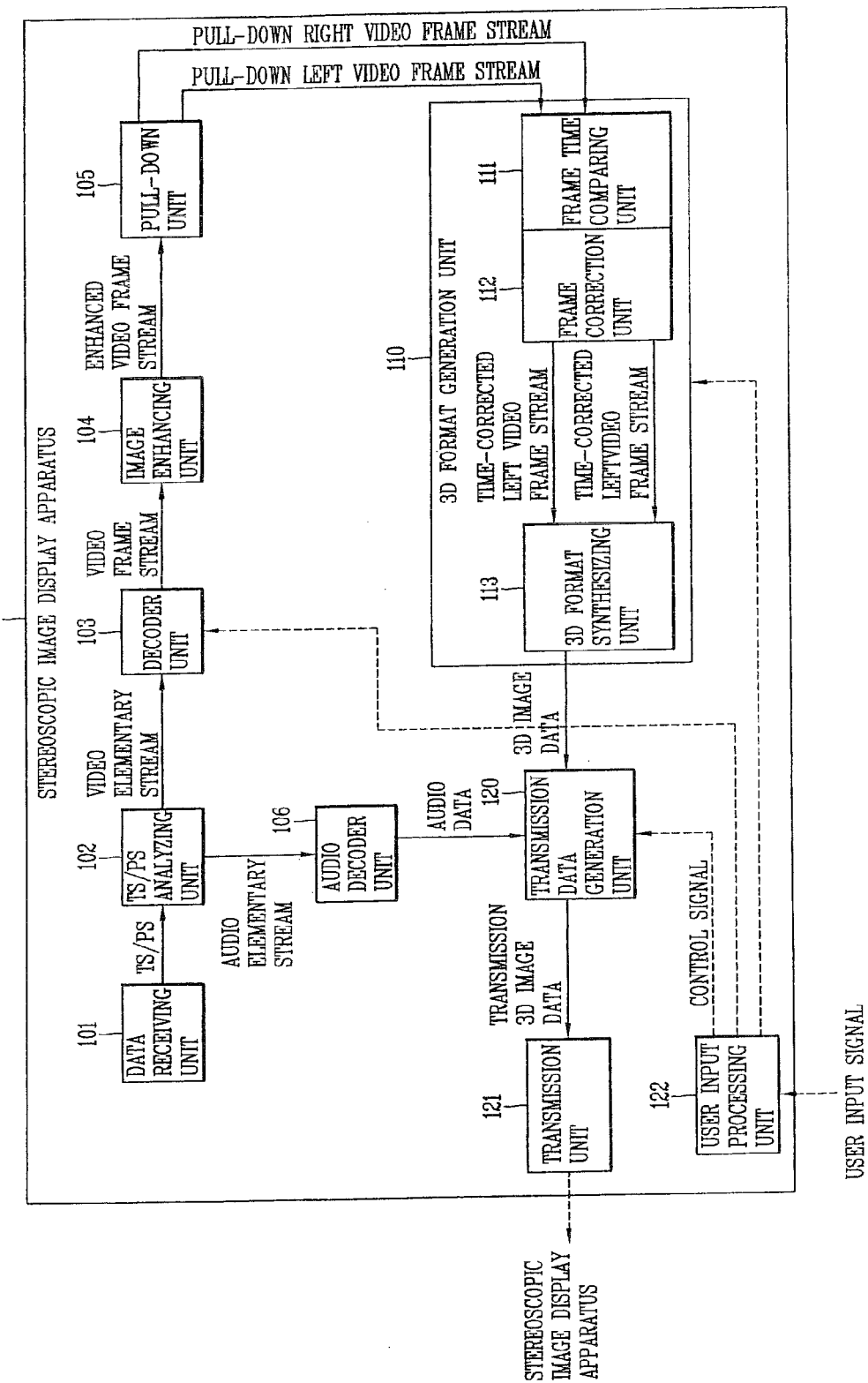
FIG. 1 is a schematic block diagram showing the configuration of an apparatus for reproducing a stereoscopic image according to an exemplary embodiment of the present invention.

Embodiments of the present invention will be described below in detail with reference to the accompanying drawings, where those components are rendered the same reference number that are the same or are in correspondence, regardless of the figure number, and redundant explanations are omitted.

Throughout the specification and claims, unless explicitly described to the contrary, the word "comprise" and variations such as "comprises" or "comprising", will be understood to imply the inclusion of stated elements but not the exclusion of any other elements. Also, terms 'part', 'unit', or 'module', used in the specification refer to units for processing at least one function or operation, which can be implemented by hardware, software, or a combination of hardware and software.

A term of 3-D or 3D is used to explaining a visual expression or representation technique for reproducing three-dimensional (3D) video having an optical illusion effect of depth. A visual cortex of an observer interprets two images, namely, left-eye and right-eye images, as a single 3D image.

The 3D display technique employs a 3D image processing and representing technique with respect to a 3D image display-available device. Selectively, in order for the 3D image display available device to effectively provide a 3D image to the observer, a special observation device may have to be used.

Examples of 3D image processing and representation include capturing of a stereoscopic image/video, capturing of a multi-view image/video using a plurality of cameras, and processing of a 2D image and depth information, and the like. Examples of the 3D image display-available device include a liquid crystal display (LCD) having suitable hardware and/or software supporting a 3D display technique, a digital TV screen, a computer monitor, and the like. Examples of special observation devices may include specialized glasses, goggles, headgear, eyewear, and the like.

In detail, the 3D image display technique includes an anaglyph stereoscopic image (for which passive anaglyph glasses are generally used), a polarization stereoscopic image (for which, passive polarization glasses are generally used), and an alternate-frame sequencing (for which, active shutter glasses and head gear are used), an autostereoscopic display using a lenticular or barrier screen, and the like. Various ideas and features described hereinafter can be applicable to such stereoscopic image display technique.

A certain 3D image display technique may use an optical device which is rotated or alternatively operated, for example, a segmented polarizer attached to a color filter wheel, and in this case, the both must be necessarily synchronized. Other 3D image display techniques may use a digital light processor (DLP) based on a digital micromirror device (DMD) using a rotatable microscopic mirror disposed in a quadrangular arrangement corresponding to pixels of an image to be displayed.

Meanwhile, new type standards related to rendering of as stereoscopic image and a display technique (in particular 3D TV) are under development by various enterprises, consortium, and organizations. For example, there are the society of motion picture and television engineers (SMPTE), a consumer electronics association (CEA), a 3d@Home consortium, and international telecommunication union), and the like. Besides, other standardization groups such as DVB, BDA ARIB, ATSC, DVD forum, IEC, and the like, are participating. MPEG (Moving Picture Experts Group) are participating in 3D image coding of a multi-view image, a stereoscopic image, and a 2D image having depth information, and currently, a multi-view video coding extension with respect to an MPEG-4 AVC (Advanced Video Coding) is under standardization. The stereoscopic image coding and stereoscopic distribution formatting are related to color shifting (Anaglyph), pixel sub-sampling (side-by-side, checkerboard, quincunx)), and enhanced video coding (2D+delta, 2D+meta data, 2D having depth information). The ideas and features described herein can be applicable to such standards.

Also, At least a portion of the ideas and features described herein is related to a 3D image display technique described in terms of an image reproducing and displaying environment with respect to a digital image or a 3D TV. However, such details are not meant to limit various features described herein but can be applicable to different types of display techniques and devices. For example, the 3D TV technique can be applicable to Blu-ray™, console games, cable, and IPTV transmission, mobile phone contents delivery, and the like, and in this case, it can be compatible with different types of TVs, a set-top box, Blu-ray device (e.g., Blu-ray disk (BD) player)), a DVD player, and a TV contents distributor.

Meanwhile, the existing 2D image display device (2D display) creates only a single image. Meanwhile, the 3D image display device creates one 3D image as a left image and a right image.

A stereoscopic image display device alternately outputs a left image and a right image in order to crease a 3D space. The left image and the right image must be delivered to the user's left eye and right eye, respectively. In order to create a stereoscopic image without flickering, frames must be alternately transmitted more than 60 times per one second per one image to the device and displayed on the screen by the number of 120 Hz as the sum of the both images.

The method of alternately displaying a left image and a right image to implement a stereoscopic image includes a frame by frame scheme, a side by side scheme, and a top-down scheme.

The frame by frame scheme is a method in which a left image and a right image are alternately scanned to the entire screen. The frame by frame scheme is also called a frame sequential scheme which alternately displays a left image and a right image and uses the original maximum resolution, and this characteristics is called full resolution.

The side by side scheme is a method of dividing a screen into left and right screens and scanning a left image and a right image to the respective screens. The top-down scheme is a method of dividing the screen into upper and lower screens and scanning left and right images to the respective screens. An apparatus 100 for reproducing a stereoscopic image according to an exemplary embodiment of the present invention will now be described. FIG. 1 is a schematic block diagram showing the configuration of an apparatus for reproducing a stereoscopic image according to an exemplary embodiment of the present invention.

As shown in FIG. 1, the apparatus for reproducing a stereoscopic image includes a data receiving unit 101, a transport stream (TS)/packetized stream (PS) analyzing unit (or TS/PS filter and demux) 102, a decoder unit 103, an image enhancing unit (or a digital processing enhancer) 104, a pull-down unit 105, an audio decoder unit 106, a 3D format generation unit (or a left/right frame merger) 110, a transmission data generation unit (or a renderer & AV Mux) 120, a transmission unit 121, and a user input processing unit 122.

The data receiving unit 101 receives contents through radio waves, a cable, a disk device, and the like, and loads data to output a transport stream (TS) or a packetized stream. In general, the video data transmitted through radio waves or a disk is formatted in the form of a transport stream of an MPEG (Moving Picture Experts Group) system.

In particular, MPEG-2, a processing method for compressing video of high picture quality, is widely used in various fields such as a storage medium such as a DVD (Digital Versatile Disk), a digital TV broadcast such as a satellite, a cable, terrestrial, and the like, a personal video recorder (PVR), a video transmission in a network, and the like.

The TS/PS analyzing unit 102 receives the transport stream or the packetized stream output by the data receiving unit 101, filters a packet corresponding to video to be reproduced from the transport stream or the packetized stream, parses the packet, and outputs the parsing results as a video elementary stream and an audio elementary stream.

The decoder unit 103 receives the video elementary stream output from the TS/PS analyzing unit 102, and decodes the received video elementary stream. In an apparatus for reproducing a stereoscopic image using a codec such as a multi-view video codec (MVC), and the like, a demultiplexer function is added to the decoder unit 103 in order to split video data, which has been delivered as a single stream before the decoder unit 103, into a left image and a right image and output the same.

In an exemplary embodiment of the present invention, the case in which a particular codec is set as a default in the decoder unit 103 has been described. However, a plurality of decoder units may be positioned within the apparatus 100 for reproducing a stereoscopic image according to the types of codecs supported by the apparatus 100 for reproducing a stereoscopic image. In this case, depending on which of codecs employing the video elementary stream, the video elementary stream is inputted to the decoder fitting the corresponding codec. Upon receiving the video elementary stream, the decoder 103 performs a decoding operation thereon. Also, the setting of the codec of the decoder unit 103 may be changed according to a user selection. Namely, the coded applied to decoding may be changed through a user's selective input. In this case, MPEG-2, MPEG-4 PART 2, H.264, and the like, may be selected as a coded.

The audio decoder unit 106 receives the audio elementary stream output by the TS/PS analyzing unit 102, decodes the received audio elementary stream, and outputs audio data.

The image enhancing unit 104 receives the video frame stream output by the decoder unit 106. The image enhancing unit 104 processes, such as deinterlaces or image-enhances, the received video frame stream, and outputs the processing results as an enhanced video frame stream.

When the processing operation such as deinterlacing, the image enhancing, and the like, is unnecessary in the apparatus 100 for reproducing a stereoscopic image, the image enhancing unit 104 may be omitted in the apparatus 100 for reproducing a stereoscopic image.

The pull-down unit 105 receives the enhanced video frame stream output by the image enhancing unit 104. The image enhancing 104 may be omitted in the configuration of the apparatus 100 for reproducing a stereoscopic image according to an exemplary embodiment of the present invention. In this case, the pull-down unit 105 receives the video frame stream from the decoder unit 103.

The pull-down unit 105 performs a pull-down operation on the input and outputs the results as a pull-down video frame stream.

Because 120 frames per second including left and right video frames are required in terms of the characteristics of the apparatus for reproducing a stereoscopic image, if enhanced video frame streams fall short of the level, the pull-down unit 105 performs pull-down to make the video frame streams 120 frames per second.

The 3D format generation unit 110 processes and manipulates the received left and right video frame streams to generate a 3D image data, and outputs the same.

The 3D format generation unit 110 according to an exemplary embodiment of the present invention includes a frame time comparing unit 111, a frame correction unit 112, and a 3D format synthesizing unit 113.

In the apparatus for reproducing a stereoscopic image, in order to create a precise stereoscopic image, the left and right images must be synchronized by using time stamp information. Namely, a stereoscopic image transmitted to an external display device or displayed on a display unit of the device includes a pair of left and right images connected to have the same time relationship in a time axis, and the stereoscopic image can be generated by displaying the pair of left and right images on the display device.

The frame time comparing unit 111 and the frame correction unit 112 perform the paring operation on the left and right images.

The frame time comparing unit 111 analyzes and compares a time relationship between left and right frames of the left video frame stream and the right video frame stream received by the 3D format generation unit 110. Thereafter, the frame correction unit 112 performs synchronization on frames having a delayed time relationship and outputs the processing results as a time-corrected left video frame stream and a time-corrected right video frame stream.

The 3D format synthesizing unit 113 receives the time-corrected left video frame stream and the time-corrected right video frame stream output from the frame correction unit 112. The 3D format synthesizing unit 113 merges the time-corrected left video frame stream and the time-corrected right video frame stream to generate 3D image data, and outputs the 3D image data.

The transmission data generation unit 120 receives the 3D image data output from the 3D format generation unit 110 and the audio data output from the audio decoder unit 106. The transmission data generation unit 120 synthesizes the 3D image data and the audio data and re-formats the synthesized data so that it can be transmitted to a device, such as a TV, or the like, that may display an image. If necessary, the 3D image data may be overlaid with a different video image, and the overlaid image may be synthesized with the audio data. The transmission data generation unit 120 outputs the 3D image data to be transmitted (or the transmission 3D image data), which has been generated through re-formatting.

The transmission unit 121 transmits the transmission 3D image data output from the transmission data generation unit 120. The transmission unit 121 may be an input/output port such as a high definition multimedia interface (HDMI) or a video graphics array (VGA), or may be a wired or wireless network interface.

When the apparatus 100 for reproducing a stereoscopic image is a stereoscopic image display device integrated with a display device such as a digital TV, or the like, the data may be delivered to an image reproducing unit of the stereoscopic image display device without going through the transmission unit. The stereoscopic image display device may include a stereoscopic image TV, a stereoscopic image monitor, a stereoscopic image monitor integrated reproducing device, and the like.

When the user delivers a control command through an input button, a remote controller, a network, and the like, the user input processing unit 122 receives the control command and delivers a control signal to the decoder unit 103, the transmission data generation unit 120, the 3D format generation unit 110, or the like.

The types of the control signals may include a reproducing command, a stoppage command, a multiple speed operation command, and the like, in case of the decoder unit 103, and a transmission data resolution regulation, an interface mode control command, or the like, in case of the transmission data generation unit 120.

Figure 2:
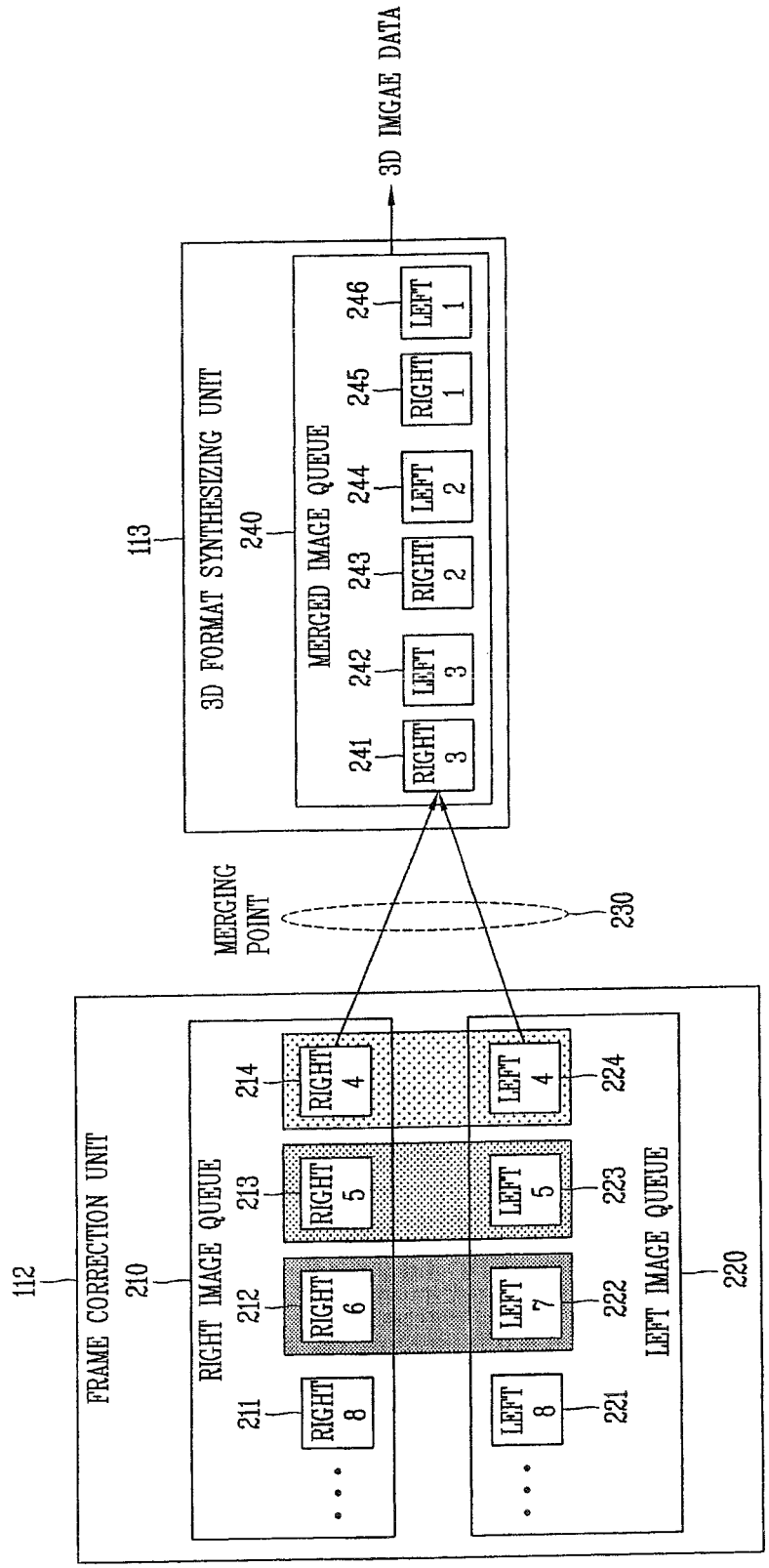
FIG. 2 is a view for explaining the operation of a 3D format generation unit when a stereoscopic image is reproduced according to an exemplary embodiment of the present invention.

FIG. 2 is a view for explaining the operation of a 3D format generation unit when a stereoscopic image is reproduced according to an exemplary embodiment of the present invention.

As shown in FIG. 2, the frame correction unit 112 according to an exemplary embodiment of the present invention includes a left image queue 220 and a right image queue 210, and the 3D format synthesizing unit 113 includes a merged image queue 240.

The frame correction unit 112 inserts a left video frame into the left image queue 220 and a right video frame into the right image queue 210 according to a time stamp. Left video frame and right video frame which are at the same to positions of the both queue in a vertical direction (e.g., 214 and 224) have the same time stamp.

The left video frame stored init eh left image queue 220 and the right video frame stored in the right image queue 210 are extracted from the respective queues in a first-in first-out manner, makes a pair at a merging point 230, and then sequentially input to the merged image queue 240. The left image queue 220 and the right image queue 210 receive the time-corrected left video frame and the time-corrected right frame, so the left video frame and the right video frame paired at the merging point have the same time stamp value.

The merged image queue 240 receives the left video frame and the right video frame having the same time stamp from the left image queue 220 and the right image queue 220 and stores them. The frames stored in the merged image queue 240 are output in a first-in first-out manner.

Figure 3:
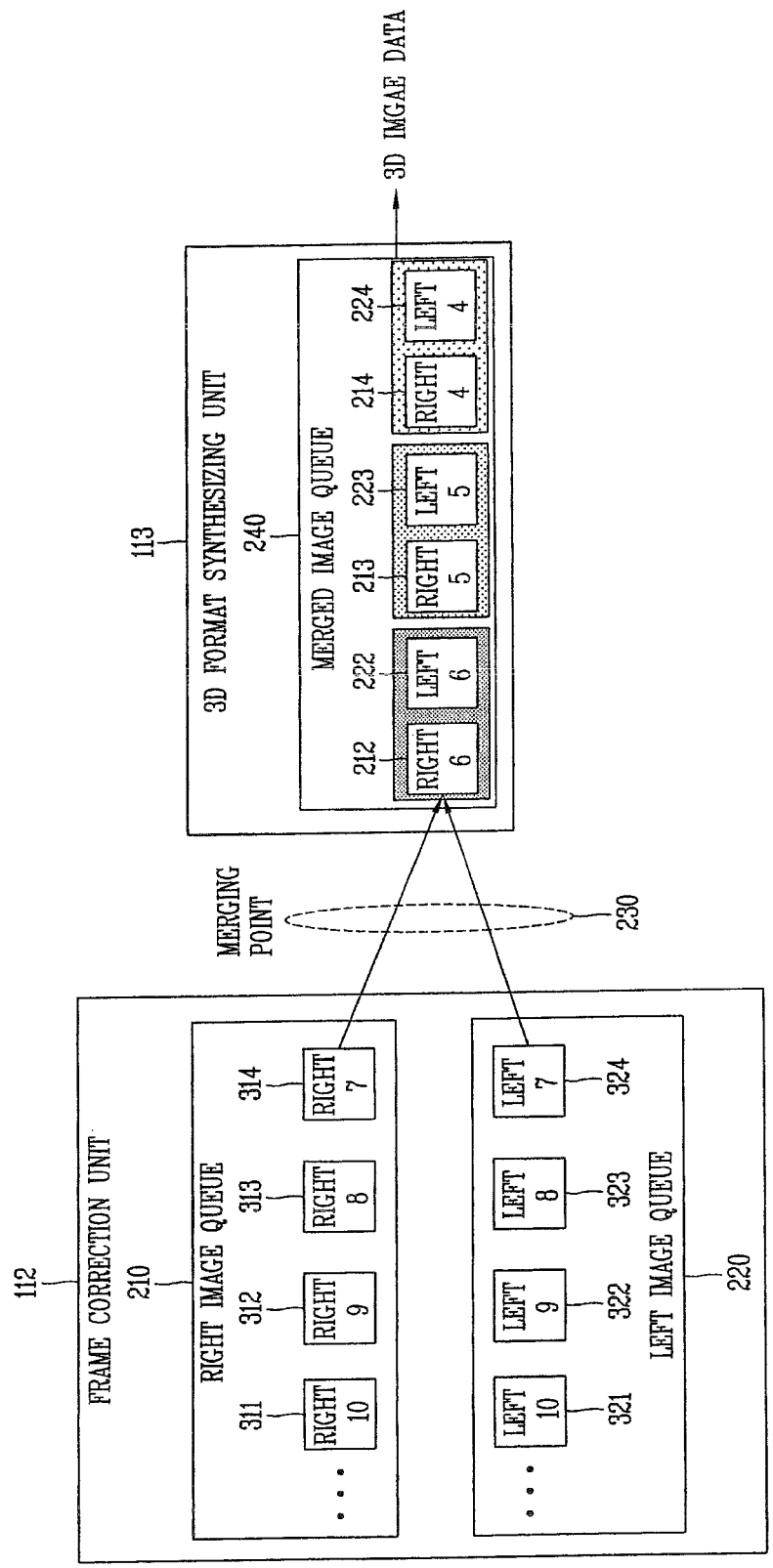
FIG. 3 is a view for explaining a change in internal data of the 3D format generation unit when a stereoscopic image is reproduced according to an exemplary embodiment of the present invention.

FIGS. 2 and 3 show the procedure of processing the image frames stored in the queues of the frame correction unit 112 and the 3D format synthesizing unit 113 according to an exemplary embodiment of the present invention.

In FIG. 2, the merged image queue 240 stores the left video frames and the right video frames input from the left image queue 220 and the right image queue 210 in order.

Among the left video frame and the right video frame having the same time stamp, the left video frame is first output and the right video frame is then output. The merged image queue 240 stores a left frame 1 (246), a right frame 1 (245), a left frame 2 (244), a right frame 2 (243), a left frame 3 (242), and a right frame 3 (241), and outputs them in this order.

The left image queue 220 stores the left video frames which are not yet to output after being inserted. The video frames include a left frame 4 (224), a left frame 5 (223), a left frame 6 (222), and a left frame 7 (221), and output in this order.

The right image queue 210 stores the left video frames which are not yet output after being inserted. The video frames include a right frame 4 (214), a right frame 5 (213), a right frame 6 (212), and a right frame 7 (211), and output in this order.

FIG. 3 illustrates the frames in the respective queues after three pairs of left and right frames are output from the merged image queue 240 in FIG. 2.

The left frame 1 246, the right frame 1 245, the left frame 2 244, the right frame 2 243, the left frame 3 242, and the right frame 3 241 in FIG. 2 are output from the merged image queue 240. And the left frame 4 224, the right frame 4 214, the left frame 5 223, the right frame 5 213, the left frame 6 222, and the right frame 6 212 are input from the left image queue 220 and the right image queue 210 through the merging point 230.

The left frame 4 224, the left frame 5 223, and the left frame 6 222 are output from the left image queue 220, and the left frame 8 (323), the left frame (322), and the left frame 10 (321) are input thereto in order.

The right frame 4 214, the right frame 5 213, and the right frame 6 212 are output from the right image queue 220, and the right frame 8 323, the right frame 9 322, and the right frame 10 321 are input thereto in order.

As described above, in the apparatus for reproducing a stereoscopic image alternately outputs the left and right frames to reproduce a stereoscopic image.

The operation of the apparatus 100 for reproducing a stereoscopic image when the user issues a pause command will now be described.

In the apparatus for reproducing a stereoscopic image according to an exemplary embodiment of the present invention, when the user issues a pause command, the command is delivered to the user input processing unit 122. The user input processing unit 122 transmits the pause command to the decoder unit 103, so that the decoder unit 103 may stop a decoding operation.

Also, the pause command is transmitted to the frame time comparing unit 111 and the frame correction unit 112 so that a frame finally received from the pull-down unit 105 can be re-used. Because the frame correction unit 112 re-uses the frame finally received from the full-down unit, it merely outputs the frames at the end of the left image queue 220 and the right image queue 210, and because the queues do not remove the frames, the frames are repeatedly output.

As a result, the same pair of left and right frames is input to the merged image queue 240 of the 3D format synthesizing unit 113, so the same pairs of left and right frames are repeatedly output from the merged image queue 240, whereby the stereoscopic image is output even in the pause mode.

The operation of the 3D format generation unit 110 when the pause mode selection is received from the user will now be described in more detail with reference to FIGS. 4 and 5.

Figure 4:
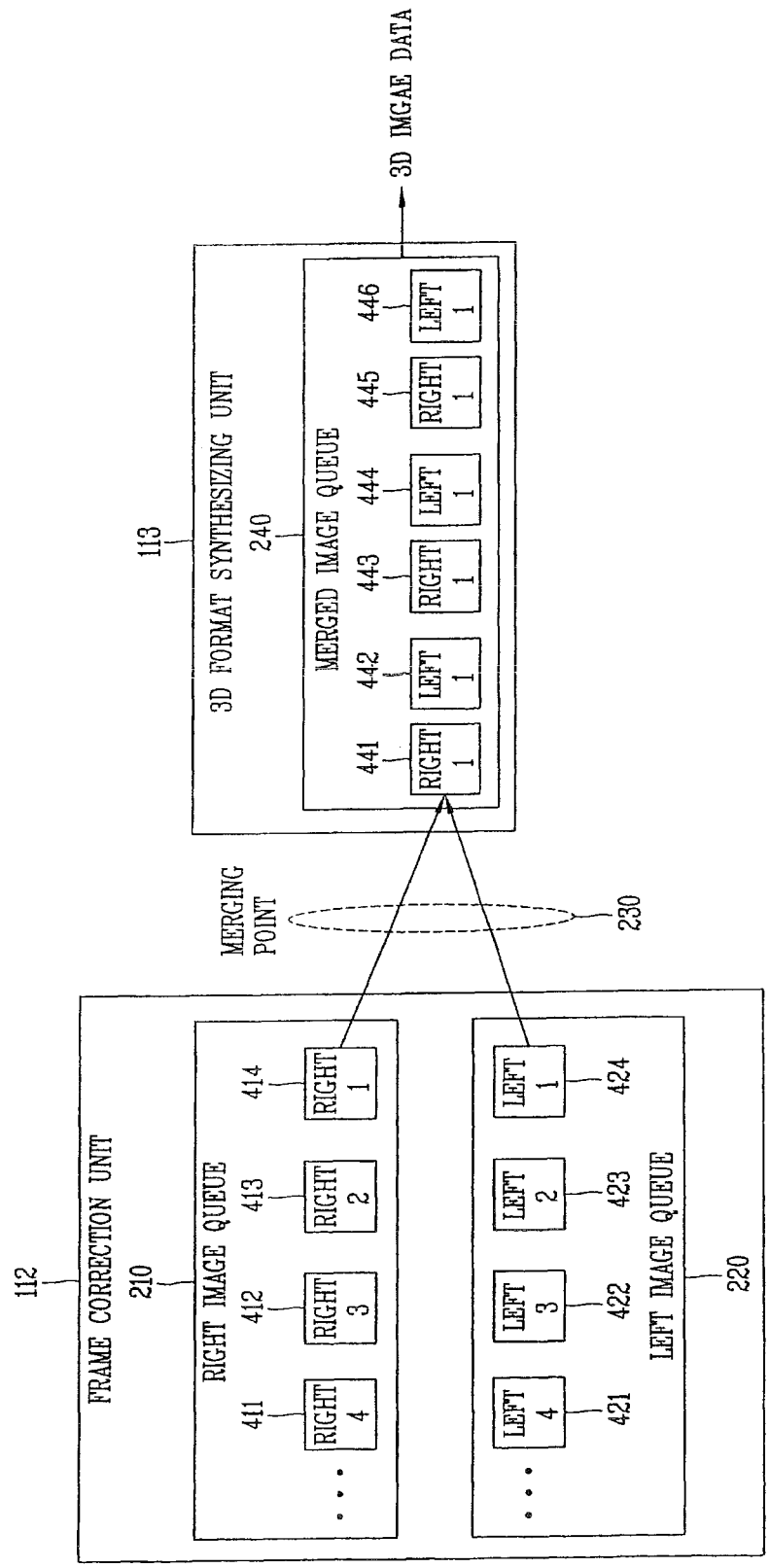
FIG. 4 is a view for explaining an example of the 3D format generation unit for outputting a stereoscopic image when the stereoscopic image is paused while being reproduced according to an exemplary embodiment of the present invention.

FIG. 4 is a view for explaining an example of the 3D format generation unit 110 for outputting a stereoscopic image when the stereoscopic image is paused while being reproduced according to an exemplary embodiment of the present invention.

When a signal of a pause mode is delivered from the user input processing unit 122, the frame correction unit 122 re-uses the finally received frame. Thus, the left image queue 220 repeatedly outputs the left frame 1 424, and the right image queue 210 repeatedly outputs the right frame 1 414.

The merged image queue 240 merges the frames output from the left image queue and the right image queue in the same manner as the case in which a stereoscopic image is reproduced. As a result, the pair of the left frame 1 and the right frame 1 are repeatedly inserted into the merged image queue 240 and output from the merged image queue 240.

As described above, the apparatus illustrated in FIG. 4 repeatedly outputs the left frame 1 and the right frame 1, so that the same stereoscopic image is continuously displayed on the display device, having the pause effect.

Figure 5:
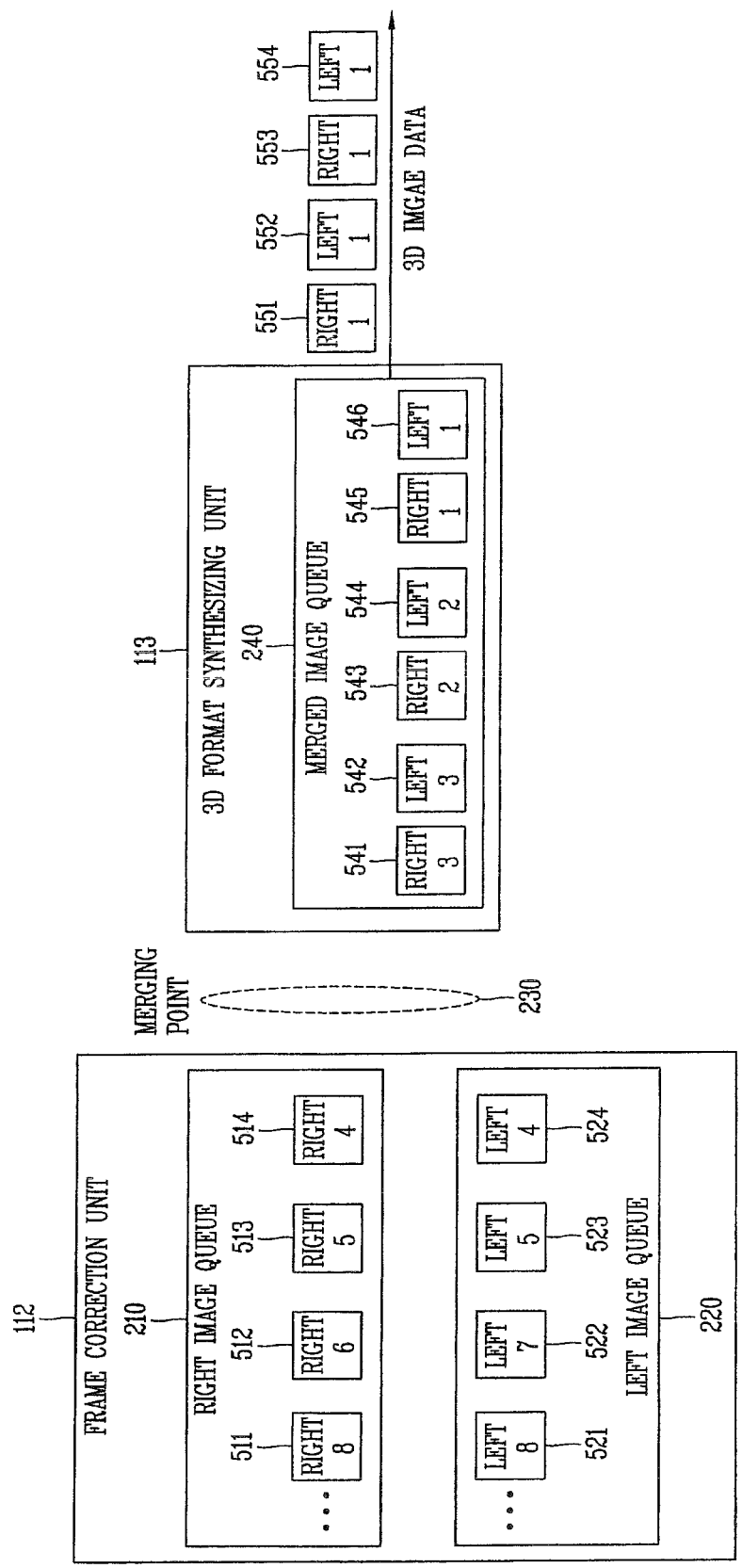
FIG. 5 is a view for explaining another example of the 3D format generation unit for outputting a stereoscopic image when the stereoscopic image is paused while being reproduced according to an exemplary embodiment of the present invention.

FIG. 5 is a view for explaining another example of the 3D format generation unit 110 for outputting a stereoscopic image when the stereoscopic image is paused while being reproduced according to an exemplary embodiment of the present invention. In FIG. 5, the same effect as that of the foregoing exemplary embodiment can be obtained through manipulation in the merged image queue 240.

In this embodiment, when the user issues a pause command, the command is delivered to the user input processing unit 122. The user input processing unit 122 transmits a signal corresponding to the pause command to the decoder unit 103 so that a decoding operation of the decoder 103 can be stopped, and transmits the signal to the 3D format generation unit 113.

The frame time comparing unit 111 stops receiving of a stream from the pull-down unit 105. The frame correction unit 500 maintains content of the queue, without performing frame input and frame output operations with respect to the left image queue 220 and the right image queue 210. Meanwhile, without inserting a to frame to the merged image queue 240, the 3D format synthesizing unit 113 alternately outputs the left frame 545 and the right frame 545 which have been first inserted into the merged image queue 240 without removing them from the queue.

As described above, the apparatus according to the present exemplary embodiment repeatedly outputs the same left and right frames, while maintaining content of the left image queue 220, the right image queue 210, and the merged image queue 240, whereby the same stereoscopic image can be continuously displayed on the display device, causing a pause effect.

Meanwhile, in a different embodiment, a single 2D frame can be generated through interpolation of a left frame and a right frame and repeatedly output in the pause mode.

Namely, in some cases, displaying of a 2D image in the pause mode may be desirous according to a user intention or a reproducing situation. In this case, in the present exemplary embodiment, the left frame and the right frame may be interpolated to generate a single frame and the 2D frame is repeatedly output.

The single 2D frame may be generated according to two methods. The method of generating a single 2D frame will now be described with reference to FIGS. 6 and 7.

Figure 6:
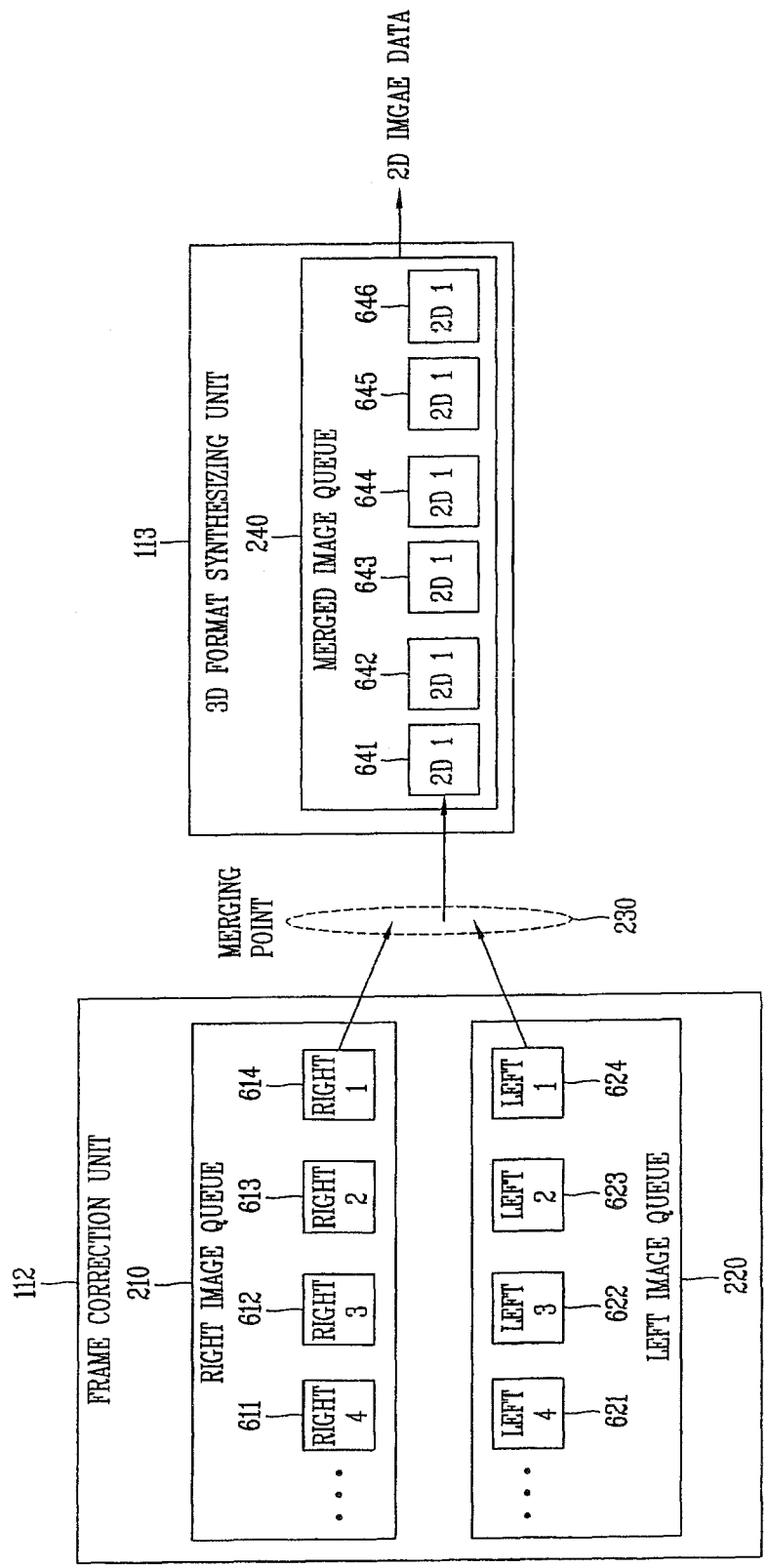
FIG. 6 is a view for explaining an example of the 3D format generation unit for outputting an interpolated 2D image when the stereoscopic image is paused while being reproduced according to an exemplary embodiment of the present invention.

FIG. 6 is a view for explaining an example of the 3D format generation unit 110 for outputting an interpolated 2D image when the stereoscopic image is paused while being reproduced according to an exemplary embodiment of the present invention.

The method illustrated in FIG. 6 is similar to the method for reproducing a stereoscopic image as illustrated in FIG. 4, except that the left frame 624 and the right frame 614 are synthesized through interpolation and a 2D frame as the synthesizing results is inserted into the merged image queue 240 twice, rather than inserting the left frame 624 and the right frame 614 in order in the merging point 230.

The method can be implemented by performing an interpolation calculation one time when the pause starts, and repeatedly inserting the 2D frame obtained as the calculation results.

Figure 7:
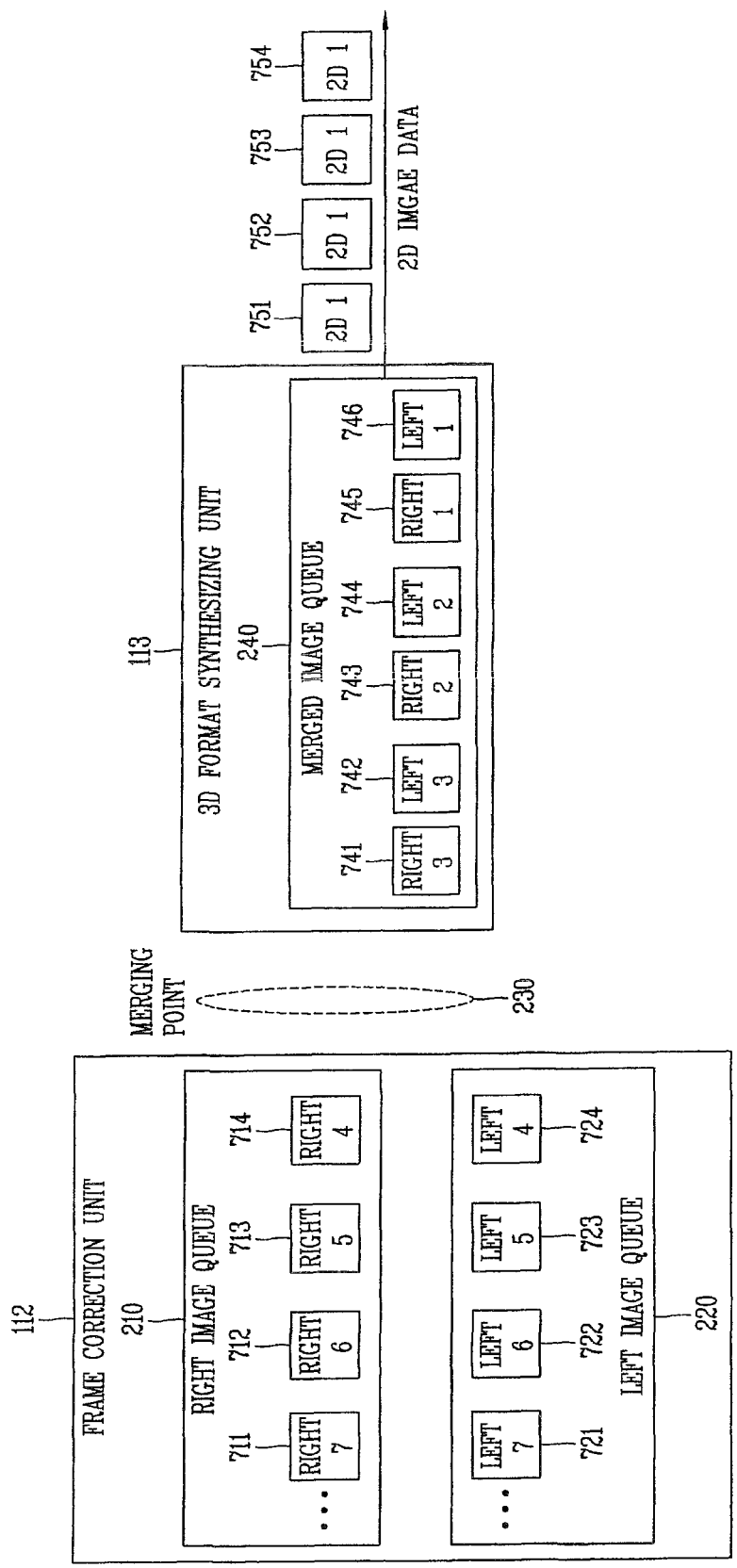
FIG. 7 is a view for explaining another example of the 3D format generation unit for outputting an interpolated 2D image when the stereoscopic image is paused while being reproduced according to an exemplary embodiment of the present invention.

FIG. 7 is a view for explaining another example of the 3D format generation unit 110 for outputting an interpolated 2D image when the stereoscopic image is paused while being reproduced according to an exemplary embodiment of the present invention.

The method illustrated in FIG. 7 is similar to the method for reproducing a stereoscopic image as illustrated in FIG. 5, except that the left frame 746 and the right frame 745 are synthesized through interpolation and a 2D frame as the synthesizing results is repeatedly output, rather than repeatedly outputting the left frame 746 and the right frame 745, which have been first inserted to the merged image queue 240, as 3D image data.

The method can be implemented by synthesizing the left frame and the right frame through interpolation in the step of outputting a 3D image in the method illustrated in FIG. 5 and outputting the synthesizing results.

As described above, according to the exemplary embodiments of the present invention, even when the pause mode is selected while a stereoscopic image is being reproduced, the stereoscopic image can be output, and in this case, the stereoscopic image being reproduced can be output in the pause mode without employing any additional configuration. Also, even when the stereoscopic image is paused while being produced, an unnatural screen image or distortion phenomenon is note generated, thereby improving the users' viewing satisfaction.

Various exemplary embodiments have been described to explain the original concept related to various aspects of the present invention. However, one or more substantial features of a particular exemplary embodiment can be applicable to one or more of other exemplary embodiments. Some elements or steps described in the respective exemplary embodiments and relevant drawings may be corrected and supplementary elements and/or steps may be deleted, moved or included.

Various features and ideas described herein may be performed by software, hardware, firmware, middleware, or any of their combinations. For example, a computer program (executed by a computer, processor, controller, and the like) stored in a computer-executable medium for implementing reproduction of a stereoscopic image in a trip mode and an apparatus for reproducing a stereoscopic image may include one or more program code sections performing various operations. Similarly, a software tool (executed by a computer, a processor, a controller, and the like) stored in a computer-executable medium for implementing reproduction of a stereoscopic image in a high speed search mode and an apparatus for reproducing a stereoscopic image may include a portion of a program code performing various operations.

The present invention can be applicable to any device that is able to display a stereoscopic image such as a digital TV, an LCD display device, a personal media player (PMP), a mobile phone, a computer monitor, and the like.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus that forms a stereoscopic image by alternately displaying a left image and a right image, for reproducing a stereoscopic image in a pause mode, the apparatus comprising:
    a decoder unit configured to perform decoding on received image information;
    a three-dimensional format generation unit configured to pair left and right images that are temporally consistent to generate stereoscopic image data; and
    a user input processing unit configured to receive a user selection with respect to image reproduction and to provide a corresponding signal to the decoder unit and the three-dimensional format generation unit,
    wherein when the user input processing unit receives a selection of a pause mode from the user, the decoder unit stops the decoding based on the signal from the user input processing unit and the three-dimensional format generation unit generates the stereoscopic image data by using the same left and right video frames,
    wherein the three-dimensional format generation unit to generate, in the pause mode, one of the stereoscopic image data and a two-dimensional image based on a user's selection received by the user input processing unit,
    wherein when the user input processing unit receives, from the user, a selection of changing the stereoscopic image being reproduced in the pause mode into the two-dimensional image, the three-dimensional format generation unit generates the two-dimensional image by interpolating the same left and right video frames based on a signal from the user input processing unit, and
    wherein the generated two-dimensional image by interpolating is repeatedly output in the pause mode.

2. The apparatus of claim 1, wherein the three-dimensional format generation unit comprises:
    a frame time comparing unit configured to receive the left and right video frame streams and comparatively analyze a time relationship between the frames;
    a frame correction unit configured to output a pair of the left and right video frames that are temporally consistent based on the analysis result from the frame time comparing unit; and
    a three-dimensional format synthesizing unit configured to integrate the left and right video frames output from the frame correction unit to generate three-dimensional format image data,
    wherein when the user input processing unit receives a selection of the pause mode from the user, the frame correction unit alternately repeatedly outputs the same left and right video frames to the three-dimensional format synthesizing unit based on the signal from the user input processing unit.

3. The apparatus of claim 1, wherein the three-dimensional format generation unit comprises:
    a frame time comparing unit configured to receive the left and right video frame streams and comparatively analyze a time relationship between the frames;
    a frame correction unit configured to output a pair of the left and right video frames that are temporally consistent based on the analysis result from the frame time comparing unit; and
    a three-dimensional format synthesizing unit configured to integrate the left and right video frames output from the frame correction unit to generate three-dimensional format image data,
    wherein when the user input processing unit receives a selection of the pause mode from the user, the three-dimensional format synthesizing unit repeatedly outputs the same three-dimensional format image data based on the signal from the user input processing unit.

4. The apparatus of claim 1, wherein the three-dimensional format generation unit to generate, in the pause mode, one of the stereoscopic image data and a two-dimensional image based on a user's selection received by the user input processing unit, and wherein when the user input processing unit receives a selection of changing the stereoscopic image being reproduced in the pause mode into a two-dimensional image from the user, the three-dimensional format generation unit generates the two-dimensional image by using the same left and right video frames based on a signal from the user input processing unit.

5. A method that forms a stereoscopic image by alternately displaying a left image and a right image, for reproducing a stereoscopic image in a pause mode, the method comprising:
    reproducing a stereoscopic image by a decoder unit and a three-dimensional format generation unit, wherein the decoder unit is configured to perform decoding on received image information, and wherein the three-dimensional format generation unit is configured to pair left and right images that are temporally consistent to generate stereoscopic image data;
    while the stereoscopic image is being reproduced, receiving a selection of a pause mode from a user; and
    when the pause mode is entered, generating the stereoscopic image by using the same left and right images, to thus form the stereoscopic image even in the pause mode,
    wherein the three-dimensional format generation unit to generate, in the pause mode, one of the stereoscopic image data and a two-dimensional image based on a user's selection received by the user input processing unit, and
    wherein when the user input processing unit receives, from the user, a selection of changing the stereoscopic image being reproduced in the pause mode into the two-dimensional image, the three-dimensional format generation unit generates the two-dimensional image by using the same left and right video frames based on a signal from the user input processing unit.

6. The method of claim 5, further comprising:

receiving a selection for changing the three-dimensional image into the two-dimensional image from the user in the pause mode; and generating the two-dimensional image by interpolating the left and right images that have been used to form the stereoscopic image, and reproducing the two-dimensional image by changing the stereoscopic image into the two-dimensional image.

7. The method of claim 5, further comprising:

receiving a selection for changing of the stereoscopic image into the two-dimensional image from the user in the pause mode; and generating the two-dimensional image by selecting any one of the left image and the right image that has been used to form the stereoscopic image, and reproducing the two-dimensional image by changing the stereoscopic image into the two-dimensional image.

8. A television that forms a stereoscopic image by alternately displaying a left image and a right image, for reproducing a stereoscopic image in a pause mode, the television comprising:

a decoder unit configured to perform decoding on received image information;

a three-dimensional format generation unit configured to pair left and right images that are temporally consistent to generate stereoscopic image data; and a user input processing unit configured to receive a user selection with respect to image reproduction and deliver a corresponding signal to the decoder unit and the three-dimensional format generation unit, wherein when the user input processing receives a selection of a pause mode from the user, the decoder unit stops the decoding based on the signal from the user input processing unit and the three-dimensional format generation unit generates the stereoscopic image data by using the same left and right video frames, wherein when the user input processing unit receives, from the user, a selection of changing the stereoscopic image being reproduced in the pause mode into a two-dimensional image, the three-dimensional format generation unit generates the two-dimensional image by using the same left and right video frames based on a signal from the user input processing unit.

9. The television of claim 8, wherein the three-dimensional format generation unit comprises:

a frame time comparing unit configured to receive the left and right video frame streams and comparatively analyze a time relationship between the frames;

a frame correction unit configured to output a pair of the left and right video frames that are temporally consistent based on the analysis result from the frame time comparing unit; and a three-dimensional format synthesizing unit configured to integrate the left and right video frames output from the frame correction unit to generate three-dimensional format image data, wherein when the user input processing unit receives a selection of the pause mode from the user, the frame correction unit alternately repeatedly outputs the same left and right video frames to the three-dimensional format synthesizing unit based on the signal from the user input processing unit.

10. The television of claim 8, wherein the three-dimensional format generation unit comprises:

a frame time comparing unit configured to receive the left and right video frame streams and comparatively analyze a time relationship between the frames;

a frame correction unit configured to output a pair of the left and right video frames that are temporally consistent based on the analysis result from the frame time comparing unit; and a three-dimensional format synthesizing unit configured to integrate the left and right video frames output from the frame correction unit to generate three-dimensional format image data, wherein when the user input processing unit receives a selection of the pause mode from the user, the three-dimensional format synthesizing unit repeatedly outputs the same three-dimensional format image data based on the signal from the user input processing unit, wherein the three-dimensional format generation unit to generate, in the pause mode, one of the stereoscopic image data and a two-dimensional image based on a user's selection received by the user input processing unit, and wherein when the user input processing unit receives, from the user, a selection of changing the stereoscopic image being reproduced in the pause mode into the two-dimensional image, the three-dimensional format generation unit generates the two-dimensional image by using the same left and right video frames based on a signal from the user input processing unit.

11. The television of claim 8, wherein when the user input processing unit receives, from the user, a selection of changing the stereoscopic image being reproduced in the pause mode into the two-dimensional image, the three-dimensional format generation unit generates the two-dimensional image by interpolating the same left and right video frames based on a signal from the user input processing unit, and wherein the generated two-dimensional image by interpolating is repeatedly output in the pause mode.

* * * * *